United States Patent
R et al.

(10) Patent No.: US 11,934,393 B2
(45) Date of Patent: Mar. 19, 2024

(54) INPUT VALIDATION API USING MACHINE LEARNING AND DATABASE INPUT VALIDATION FRAMEWORK

(71) Applicant: SAP SE, Walldorf (DE)

(72) Inventors: Jai Vignesh R, Chennai (IN); Jhansi Rani B, Bangalore (IN)

(73) Assignee: SAP SE, Walldorf (DE)

( * ) Notice: Subject to any disclaimer, the term of this patent is extended or adjusted under 35 U.S.C. 154(b) by 157 days.

(21) Appl. No.: 17/147,056

(22) Filed: Jan. 12, 2021

(65) Prior Publication Data

US 2022/0229831 A1    Jul. 21, 2022

(51) Int. Cl.
*G06F 17/00* (2019.01)
*G06F 16/245* (2019.01)
*G06N 5/04* (2023.01)
*G06N 20/00* (2019.01)

(52) U.S. Cl.
CPC ............. *G06F 16/245* (2019.01); *G06N 5/04* (2013.01); *G06N 20/00* (2019.01)

(58) Field of Classification Search
CPC ......... G06F 16/245; G06N 5/04; G06N 20/00
See application file for complete search history.

(56) References Cited

U.S. PATENT DOCUMENTS

| | | | | |
|---|---|---|---|---|
| 5,845,120 A | * | 12/1998 | Reddy | ............ G06F 8/33 715/236 |
| 7,203,671 B1 | * | 4/2007 | Wong | ............ G06F 16/283 |
| 7,296,297 B2 | * | 11/2007 | Kirkpatrick | ............ H04L 67/564 709/248 |
| 8,826,421 B2 | | 9/2014 | Luo et al. | |
| 8,925,080 B2 | * | 12/2014 | Hebert | ............ H04L 63/145 726/23 |
| 9,436,730 B2 | | 9/2016 | Li et al. | |
| 10,404,744 B2 | | 9/2019 | Dinerstein et al. | |

(Continued)

FOREIGN PATENT DOCUMENTS

CN    109150886 A    1/2019

OTHER PUBLICATIONS

Seong-Kyu Kim et al., A Study on Improvement of Blockchain Application to Overcome Vulnerability of IOT Multiplatform Security, Energies 2019, 12, 402; DOI:10.3390/en12030402, 29 pages, <www.mdpi.com/journal/energies>, Jan. 27 (Year: 2019).*

(Continued)

*Primary Examiner* — Greta L Robinson
(74) *Attorney, Agent, or Firm* — Sterne, Kessler, Goldstein & Fox P.L.L.C.

(57) ABSTRACT

Disclosed herein are system, method, and computer program product embodiments for validating input requests. In an embodiment, an application program interface (API) can receive a input request from a client device or server. The API can validate the input requests based on client-side or server-side technology implemented by the client device or server. In response to validating a input request from the client device and server, the database's framework can validate the database request before processing the input request. In response to failing to validate an input request at the client device, server, or database level, a machine-learning algorithm can be used to determine how to resolve a possible error, which may have caused the failure to validate the input request.

20 Claims, 7 Drawing Sheets

(56) References Cited

U.S. PATENT DOCUMENTS

| | | | |
|---|---|---|---|
| 10,410,214 B2* | 9/2019 | Doyle | G06Q 20/382 |
| 10,447,730 B2 | 10/2019 | Gupta | |
| 10,491,565 B2 | 11/2019 | Agarwal et al. | |
| 10,846,204 B2* | 11/2020 | Vaishnav | G06N 20/00 |
| 11,010,279 B2* | 5/2021 | Morris | G06F 11/3608 |
| 11,314,621 B2* | 4/2022 | Trim | G06F 11/0754 |
| 11,403,161 B2* | 8/2022 | Pandey | G06F 11/0727 |
| 2009/0044271 A1* | 2/2009 | Benameur | G06F 21/31 |
| | | | 726/22 |
| 2019/0179934 A1* | 6/2019 | Gogineni | G06F 3/04842 |
| 2019/0303796 A1* | 10/2019 | Balasubramanian | G06N 7/005 |
| 2020/0296109 A1* | 9/2020 | Shulman | H04L 47/82 |
| 2020/0304534 A1* | 9/2020 | Rakesh | H04L 63/1433 |
| 2020/0356432 A1* | 11/2020 | Pandey | G06N 5/04 |

OTHER PUBLICATIONS

Hung Viet Nguyen et al., Auto-locating and fix-propagating for HTML validation errors to PHP server-side code. In Proceedings of the 2011 26th IEEE/ACM International Conference on Automated Software Engineering, IEEE Computer Society, 13-22, Nov (Year: 2011).*

* cited by examiner

INPUT VALIDATION API USING MACHINE LEARNING AND DATABASE INPUT VALIDATION FRAMEWORK

BACKGROUND

Data storage devices can be vulnerable to attacks, such as SQL injections, data/path directory traversals, or the like. For example, SQL injections allow an attacker to use queries to access data stored in a database, which normally the attacker would not have been able to access. By doing so, the attacker can add, modify, and delete data in the database. This allows the attacker to steal or contaminate data, as well as bring down entire systems. SQL injections can originate from the client device, server, or at the database level. Preventing such attacks require validating queries that originate at the client device, server, or database level. However, conventional methods require application logic to validate inputs at the client device, server, and database level. This can be very time consuming and inefficient. Moreover, this can use an extensive amount of computational resources, given the required programming by the application logic.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1A:
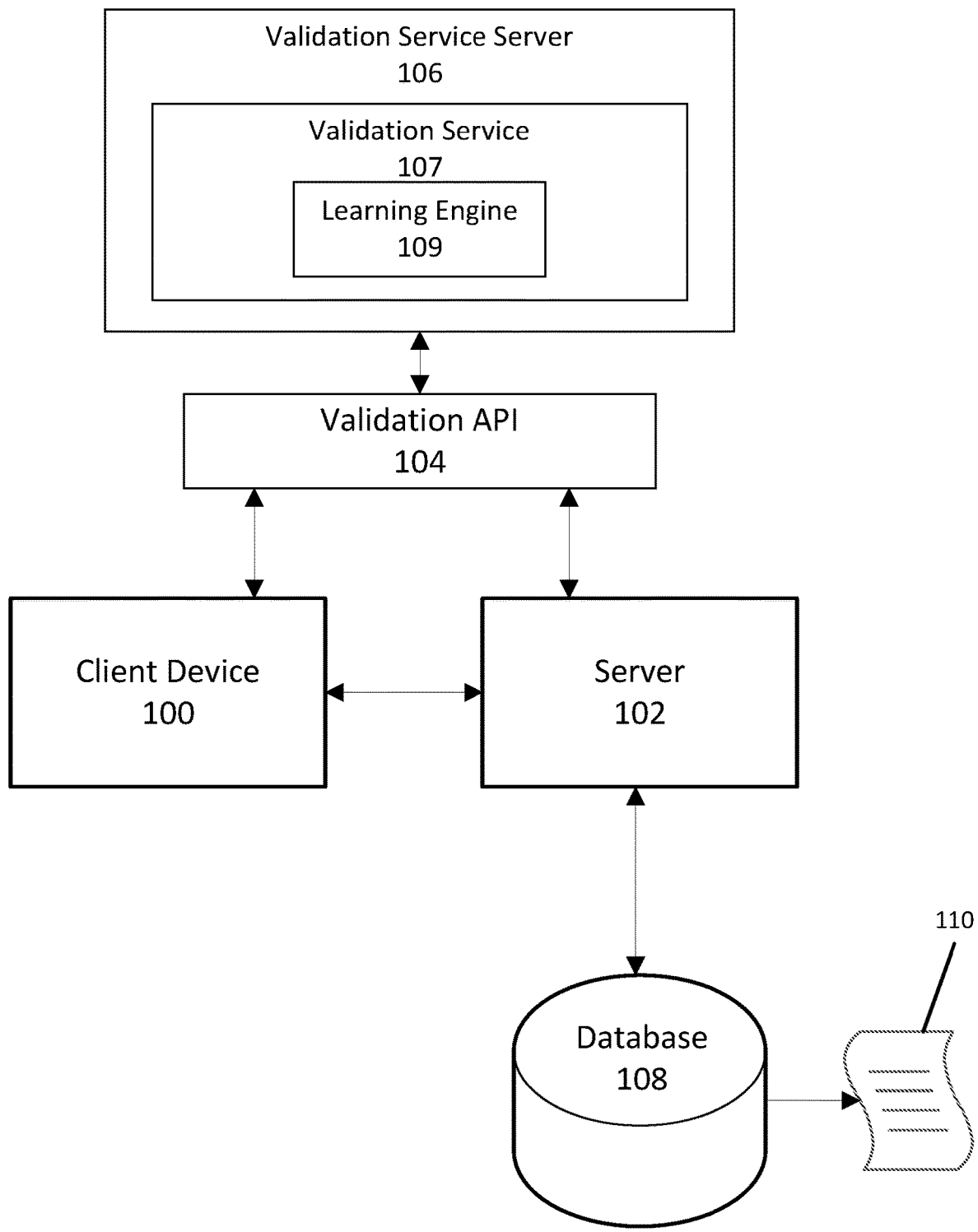
FIG. 1A is a block diagram of a system for validating input requests, according to some embodiments.

Provided herein are system, apparatus, device, method and/or computer program product embodiments, and/or combinations and sub-combinations thereof, validating input requests.

As described above, databases can be vulnerable to various attacks, such as SQL injections. The SQL injections can be used to provide unauthorized access to data using queries. The attacks can include information disclosure, unavailability, access to unauthorized data, modification of unauthorized data, or data loss. Therefore, there is a need to validate the queries at the client device, server, and database level. Without validation of the queries, the database can be left susceptible to various attacks. For example, improper or nonexistent validation of queries can result in the following types of attacks:

TABLE 1

| Attack Type | Input | Output | Critical Input |
| --- | --- | --- | --- |
| SQL Injection | User Input | SQL statement | "or" |
| Directory/Path traversal | User Input | Filename | ".." |
| Command Injection | User Input | command | ">", "\|", ";" |
| XSS (reflective) | URL parameters | HTML and/or javascript | <script |
| XSS (persisted) | Datastore | HTML and/or javascript | <script |

However, conventional systems require application logic to validate inputs. Application logic requires extensive programming, which can be inefficient and use extensive computational resources.

The method, system, and non-transitory computer-readable medium embodiments described herein solve these problems by validating input requests at the client device, server, and database level. In an embodiment, an application program interface (API) can receive a first validation request from a client device. The first validation request includes a first set of elements of a first request to be executed on a database. The API can generate a first data object, including the first set of elements included in the first validation request. The API can transmit the first data object to a validating service to validate the first data object. The validating service can validate the first data object and transmit a response, including the first validation result to the API. The API can generate and transmit a first response to the client device. The first response can include the first validation result of the first data object. In response to successfully validating the first data object, the client device can transmit the first request to the server. The server can format the first request into a second request based on server-side technology implemented by the server. The server can transmit a second validation request to the API.

The second validation request includes a second set of elements of a second request to be executed on the database. The second request mirrors the first request. The API can generate a second data object, including a second set of elements included in the second validation request, and transmit the second data object to the validating service for validation. The validation service can validate the second data object and transmit a response to the API, indicating the second validation result of the second data object. The API can transmit a second response to the server, including the second validation result of the second data object. In response to successfully validating the second data object, the server executes the second request on the database. In response to the execution of the second request by the server, a framework of the database validates the second set of elements of the second request before processing the second request.

The first validation request, second validation request, and validation of the second set of elements using the framework of the database may be executed independently of one another. The server may validate the second request irrespective of whether the client device validated the first request. Similarly, the framework of the database can validate the second set of elements of the second request irrespective of whether the client device validated the first request or the server validated the second request.

This configuration allows validation of an input request at the client device, server, and database level without using application logic. By doing so, this configuration avoids any potential attacks to the database while not having to use extensive programming at the client device, server, or database level. Moreover, this configuration efficiently validates input requests to maintain a high level of security without expending extensive levels of computational resources.

FIG. 1A is a block diagram of a system for validating input requests, according to some embodiments. In an embodiment, the system can include a client device 100, server 102, validation API 104, validation service server 106, a database 108, and a database file 110. Client device 100 can be in communication with server 102 and validation application program interface (API) 104. Server 102 can be in communication with validation API 104 and database 108. Validation API 104 can be in communication with validation service server 106. The devices in the architecture can be connected through wired connections, wireless connections, or a combination of wired and wireless connections.

As an example, the devices can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Client device 100 can host and execute one or more applications to interface with server 102. More specifically, the applications can be configured to transmit queries or requests to be executed by server 102. As a non-limiting example, the applications can be javascript applications such as OpenUI5.

Server 102 can host and execute applications to interface and execute requests or queries on database 108. Server 102 can receive requests or queries from client device 100, and server 102 can execute the request or query on database 108. The requests or queries can include adding data in database 108, access data from database 108, deleting data from database 108, or modifying data in database 108. The applications hosted and executed by server 102 can be software components configured to interface with database 108, such as a JDBC driver.

Database 108 can be one or more data storage devices configured to store data. Database 108 can be a relational database or a non-relational database. In the event database 108 is a non-relational database, database 108 can store files, documents, images, etc. . . . . Database 108 can execute requests or queries received from server 102. Database 108 can use database file 110 to build tables within database 108. Database file 110 can define rules for creating the tables and storing data in the table's fields. Database file 110 can define a framework for database 108.

Validation API 104 can be an API configured to receive and forward requests for validation to validation service server 106. Validation API 104 can be configured to receive input requests for validation from client device 100 and server 102. Input requests can be requests for adding, modifying, retrieving, or deleting data from a data storage device (e.g., a database or FTP server). For example, an input request can include queries or FTP requests.

As a non-limiting example, validation API 104 can be configured to receive data objects from javascript applications or an array of objects from software components executed on server 102. Validation API 104 can generate a data object, including the elements of the requests or queries. Validation API 104 can transmit the data object to the validation service server 106 for validating the data object. Validation API 104 can be configured to receive a response indicating a validation result of validating the data object from validation service server 106. The response can be a data object, including a validation result. Validation API 104 can generate a new data object, including the validation result, and transmit it to the client device 100 or server 102.

Validation API 104 can be configured to receive requests from both client device 100 and server 102. However, in some embodiments, client device 100 and server 102 can interface with different validation APIs.

Validation service server 106 can host a validation service 107. Validation service 107 can be an HTTP(S) service configured to validate requests or queries. Validation service 107 can receive a data object, including elements of a request or query from validation API 104. Validation service 107 can unpack the elements from the data object and validate the elements corresponding to the request or query based on a predefined set of rules. In response to validating or failing to validate the elements, validation service 107 can generate a data object including the validation result and transmit it to validation API 104.

In some embodiments, validation API 104 and validation service server 106 can reside in a cloud-based environment. In other embodiments, validation API 104 and validation service 107 can reside locally on client device 100 and server 102. For example, validation API 104 and validation service 107 can be executed as a script locally on client device 100 and server 102.

In some embodiments, validation service 107 can be configured to validate elements of requests or queries received from a client device 100 and server 102. In other embodiments, a separate validation service can validate elements of requests or queries received from a client device 100 as compared to elements of requests or queries received from a server 102.

Figure 1B:
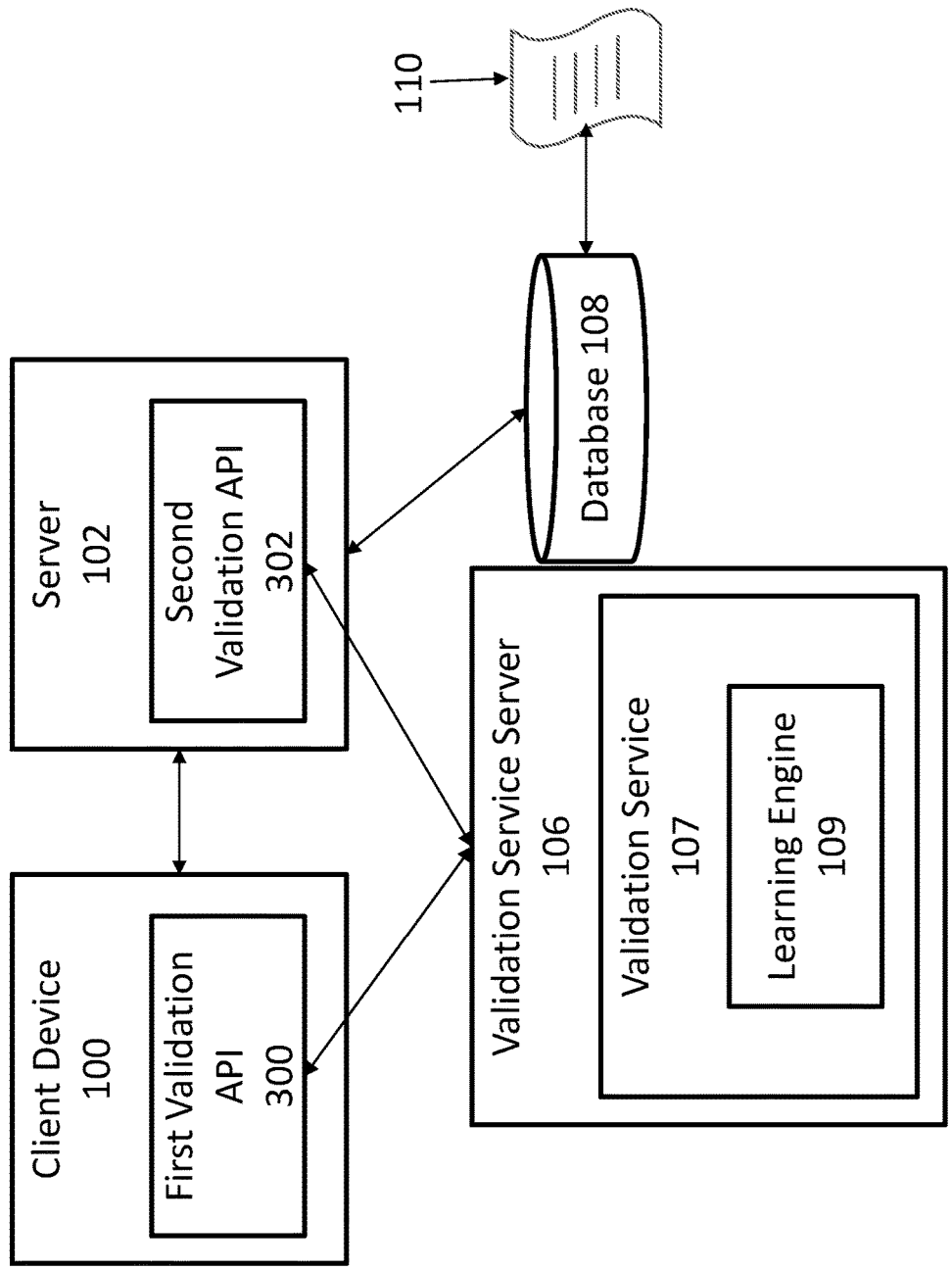
FIG. 1B is a block diagram of a system for validating input requests, including first and second validation APIs, according to some embodiments.

FIG. 1B is a block diagram of a system for validating input requests, including first and second validation APIs, according to some embodiments. Like in FIG. 1A, the system for validating input requests, including first and second validation APIs, can include client device 100, server 102, validation service server 106, and database 108. The system can further include validation service 107 executed by validation service server 106 and a database file 110. The validation service 107 may implement learning engine 109.

In a given embodiment, client device 100 can include first validation API 150, and server 102 can include second validation API 152. First validation API 150 may reside locally with respect to client device 110, and second validation API 150 may reside locally with respect to server 102.

First validation API 150 can be configured to receive validation requests from client device 100. That is, as a non-limiting example, first validation API 150 can be configured to receive data objects from javascript applications executed on client device 100. Second validation API 150 can be configured to receive validation requests from server 102. That is, second validation API 152 can be configured to receive an array of objects from a software component executing on server 102.

First validation API 150 and second validation API 151 can generate a data object, including the elements of the requests or queries. First validation API 150 and second validation API 151 can transmit the data object to the validation service server 106 for validating the data object. First validation API 150 and second validation API 151 can be configured to receive a response indicating a validation result of validating the data object from validation service server 106. The response can be a data object, including a validation result. First validation API 150 and second validation API 151 can generate a new data object, including the validation result, and transmit it to the client device 100 or server 102, respectively.

Figure 2:
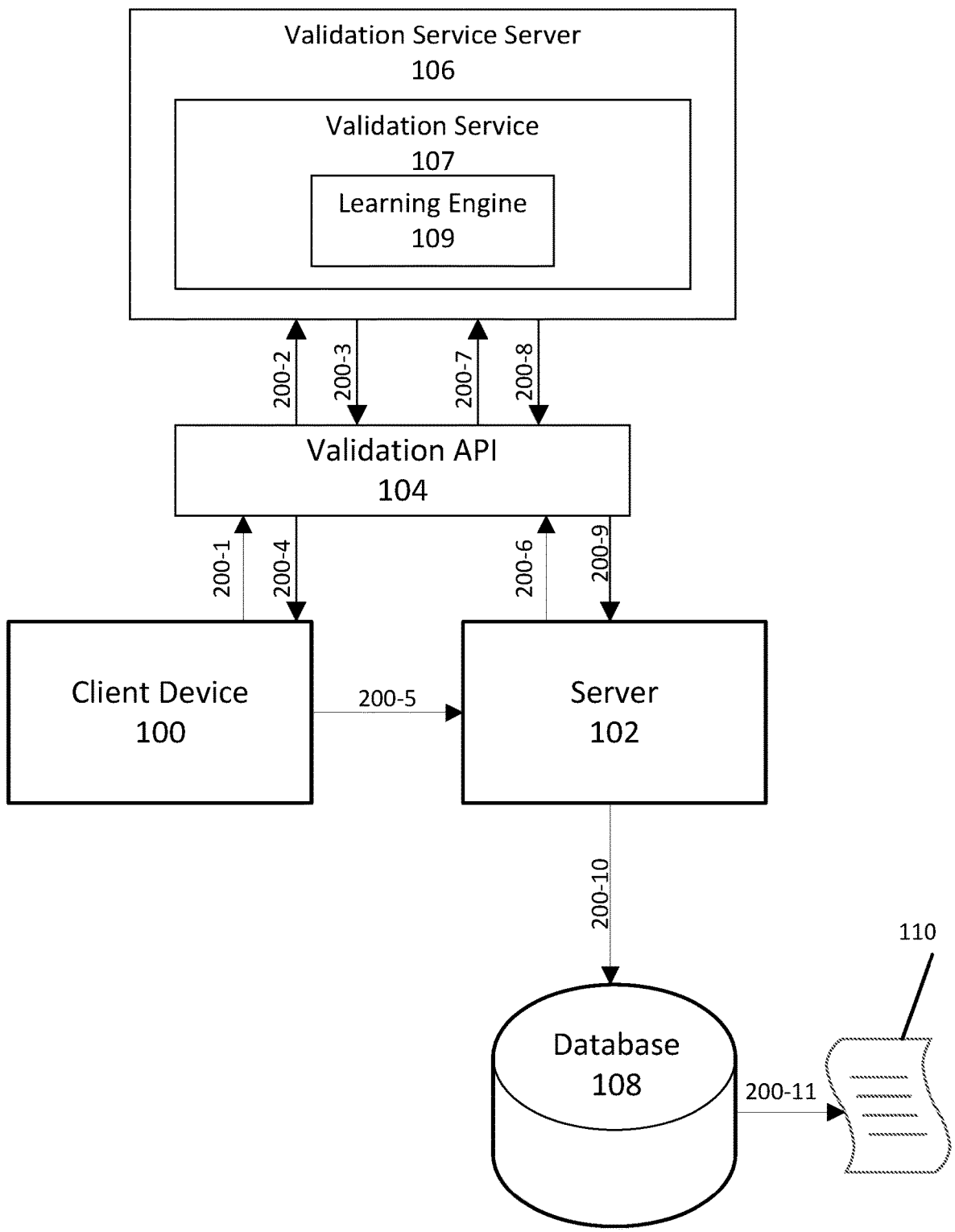
FIG. 2 is a block diagram illustrating the data flow in the system for validating input requests, according to some embodiments.

FIG. 2 will be described with reference to FIG. 1A. However, the data flow described in FIG. 2 may also be implemented with the system architecture shown in FIG. 1B.

In a given embodiment, client device 100 can attempt to transmit an input request to server 102. The input request can be a request (e.g., a query) to add, modify, access, or delete data. As an example, the input request can be a query to be executed on database 108. The input request can be routed to validation API 104 to validate the input request before sending the request to server 102.

In some embodiments, client device 100 can transmit the input request directly to validation API 104. In other embodiments, client device 100 can transmit the input request to server 102, and an application or script executing on client device 100 can forward the request to validation API 104. For example, client device 100 can execute an application that provides an interface to initialize input requests. The input requests may be requests for accessing, modifying, deleting, or adding data in database 108 or other data storage devices (e.g., FTP server). The input request can include an input control, which specifies the data to be modified, added, accessed, or deleted in database 108. Each input control can include a validation property. As such, each time data is included in the input control and the request is initialized, the validation property can trigger client device 100 to break down the input request into individual elements. As a non-limiting example, the application executed on client device 100 can be a javascript-based application and the validation property can be defined as follows: validate="{parts: [{length:'min_length, max_length]'}, {type:'type_of_data'}, {include:'[specialChar, smallChar]'}, {exclude:'<, >, ', ", {,}]'}]}" The elements can include the input, length, type, include, and exclude. There can be fewer or additional elements in the validation property. Moreover, the validation property may be in different frontend technologies. For example, the application executed on client device 100 can use prolog, c #, python, typescript, or the like.

Input can be a string input inserted in the control. This can be the string that is to be added, deleted, or accessed in database 108. Length can be a length allowed for a given input (e.g., string) in database 108. For example, the length longer than 100 characters cannot be permitted to be inserted into database 108. Type can be type of data allowed to be stored in database 108. Include can be the type of characters allowed to be stored in database 108. Exclude can be restricted or characters not allowed to be stored in database 108. Include and exclude can be configured to allow or restrict ranges of characters.

Client device 100 can generate a data object, including the elements, and transmit a request 200-1, including the data object, to validation API 104. Validation API 104 can be configured to receive validation requests from client device 100. Validation API 104 can receive the data object, including the elements. Validation API 104 can generate a new data object, including the elements included in the data object received from client device 100 in request 200-1. As a non-limiting example, validation API 104 can generate a JavaScript Object Notation (JSON) data object.

Validation API 104 can transmit a request 200-2 to validate the data object to validation service server 106. Validation service server 106 can host validation service 107. Validation service 107 can be an HTTP(S) service wrapped in an API of the corresponding client device 100 technology. As a non-limiting example, in the event client device 100 executes an application that initializes database requests using javascript, validation service 107 can be configured to validate requests generated using javascript.

Validation service 107 can unpack the elements inside the data object received with request 200-2. Validation service 107 can validate the elements based on a set of predefined rules associated with the input, length, type, include, and exclude. The predefined rules can be specific to client-side technology implemented by client device 100. As a non-limiting example, the predefined rules can be specific to requests generated using javascript applications.

Validation service 107 can fail to validate the elements based on the elements failing to comply with one or more of the predefined rules. For example, validation service 107 can fail to validate the elements based on the length of the input exceeding the allowed length. Alternatively, or in addition to, validation service 107 can fail to validate the elements based on a combination of rules, such as the input, including characters restricted by database 108 and the length of the input exceeding the allowed length. As an example, validation service 107 can attempt to validate the elements to detect potential breaches. For example, if the input request initialized by client device 100 is a query, validation service 107 can attempt to validate the elements to detect a potential SQL Injection. Alternatively, if client device 100 is connected to a file transfer protocol (FTP) server, and the input request is a request to retrieve information from the FTP server, then the validation service 107 can attempt to validate the elements to detect a potential directory/path traversal attack to retrieve information from the FTP server without authorization.

In response to validating or failing to validate the data object received with request 200-2, validation service 107 can generate a new data object indicating the validation result and any error message. The validation result can be a Boolean type data structure, and the error message can be a string. In the event validation service 107 successfully validates the data object received with request 200-2, the validation result can indicate "true," and the error message can be "null." In the event validation service 107 fails to validate the data object received with request 200-2, the validation result can indicate "false," and the error message can indicate the reason for failing to validate the data object. For example, the error message can be "input string exceeds allowed length." Alternatively, the error message can be "input string includes invalid characters." In a non-limiting example, the new data object can be a JSON data object.

Validation service 107 can transmit the new data object, including the validation result and error message in response 200-3 to validation API 104. Validation API 104 can receive response 200-3. Validation API 104 can generate a new data object, including the validation result and error message, and transmit the new data object to client device 100 in response 200-4. The data object can include instructions to add a visual effect to the input in the error message (if any). For example, the data object can include instructions to highlight the input in the error message.

In one embodiment, validation service 107 may implement a learning engine 109 configured to implement machine-learning technology to identify a solution to resolve any error. For example, learning engine 109 can implement supervised, unsupervised, reinforcement learning, or the like. Learning engine 109 can be trained using historical data associated with past solutions for resolving errors in the past across multiple client devices. The historical data may include previous user input for resolving errors, successful solutions, unsuccessful attempts at resolving errors, data associated with steps for resolving the errors, or the like. Learning engine 109 can be continuously trained using data associated with an attempt to resolve an error.

Learning engine 109 can use a machine-learning algorithm to identify a type of error based on failing to validate the elements inside the data object received with request 200-2. Learning engine 109 can use the machine-learning algorithm to determine a solution to resolve the error based on the type of error. In some embodiments, learning engine 109 can use a combination of predefined rules and a machine-learning algorithm to identify the solution. For example, the predefined rules may indicate how to resolve an error based on an error type. Learning engine 109 can determine the solution for resolving the error based on the predefined rules and machine learning algorithm. Learning engine 109 can include the solution in response 200-3, and validation API 104 can include the solution in response 200-4.

Client device 100 can receive response 200-4 and can unpack the data object in response 200-4. In the event validation service 107 failed to validate the elements included in request 200-1 and the data object in response 200-4 includes an error message, client device 100 can render the error message. Client device 100 can add a visual effect to the input in the error message (e.g., highlight the input) when displaying the error message. Moreover, in the event validation service 107 failed to validate the elements included in request 200-1, response 200-4 can include a recommended solution for resolving the error. A user of client device 100 may or may not execute the recommended solution. Learning engine 109 of validation service 107 may use the user's input with respect to the solution to continuously be trained for identifying potential solutions to identified errors.

In the event response 200-4 indicates that validation service 107 successfully validates the elements included in request 200-1, client device 100 can transmit request 200-5 to server 102. Request 200-5 can include a query to be executed on database 108, including the elements of request 200-1.

Server 102 can receive request 200-5. Server 102 can execute an application, including a software component to interface with database 10. As a non-limiting example, the software component can be a JDBC driver. The software component can process request 200-5 and generate a formatted request based on the server-side technology. The formatted request can be a query to be executed on database 108 based on request 200-5. In particular, the formatted request can mirror request 200-5. As a non-limiting example, request 200-5 can be a query written in javascript, and the software component can process the request 200-5 to generate a JAVA request. The software component may process request 200-5 to generate a request implemented in technology other than JAVA. As described above, request 200-5 can be generated in other languages such as prolog, c #, python, typescript, or the like. However, before executing the formatted request on the database, the software component can call validation API 104 to validate request 200-5.

As a non-limiting example, the software component (JDBC driver) implements the interfaces described in java.sql, including createStatement( ). This implementation returns a java.sql. Statement type object. However, as an example, before executing the createStatement( ) method is executed, the software component can generate an array of objects of type java.validation.ValidationInputObject containing elements of the formatted request. That is, the array of objects can include elements of the query corresponding to the formatted request. The elements can include input, length, type, include, and exclude. The software component can transmit the array of objects to validation API 104 in request 200-6.

Validation API 104 can receive request 200-6 and generate a new data object (e.g., JSON data object) including the elements included in the array of objects. Validation API 104 can transmit the new data object to validation service server 106 in request 200-7. Validation service 107 can validate the elements in the data object received in request 200-7 based on predefined rules associated with the elements, input, length, type, include, and exclude.

The predefined rules can be specific for the server-side technology implemented by server 102. For example, request 200-5 can include a date input in a format corresponding to the client-side technology (e.g., DD-MM-YYYY). Once formatted by the software component of server 102, the date format can be formatted to a different format (e.g., YYYY-MM-DD). As such, the predefined rules can indicate the date format for the server-side technology, and validation service 107 can validate the date field based on the format specific to the server-side technology.

Validation service 107 can unpack the elements inside the array of objects received with request 200-7. Validation service 107 can validate the elements based on a set of predefined rules associated with the input, length, type, include, and exclude. Validation service 107 can fail to validate the elements based on the elements failing to comply with one or more of the predefined rules.

In response to validating or failing to validate the array of objects received with request 200-7, validation service 107 can generate a new data object indicating the validation result and error message. The validation result can be a Boolean type data structure, and the error message can be a string. In the event validation service 107 successfully validates the data object received with request 200-7, the validation result can indicate "true," and the error message can be "null." In the event validation service 107 fails to validate the array of objects received with request 200-7, the validation result can indicate "false," and the error message can indicate the reason for failing to validate the data object. In a non-limiting example, the new data object can be a JSON data object.

Validation service 107 can transmit the new data object, including the validation result and error message in response 200-8 to validation API 104. Validation API 104 can receive response 200-8. Validation API 104 can generate a new data object, including the validation result and error message, and transmit the new data object to server 102 in response 200-9. The error message can include the reason for failing to validate the elements of the array of objects and an except generated by validation API 104.

In one embodiment, validation service 107 may implement learning engine 109 configured to implement machine-learning technology to identify a solution to resolve any error, as described above. The solution to the error may be in response 200-8 and response 200-9.

Server 102 can receive response 200-9. Moreover, in the event validation service 107 failed to validate the elements included in the array of objects, response 200-9 can include a recommended solution for resolving the error. A user of server 102 may or may not execute the recommended solution. Learning engine 109 in validation service 107 may use the user's input with respect to the solution to continuously be trained for identifying potential solutions to identified errors.

In the event validation service 107 was successfully able to validate the elements in the array of objects, server 102 executes the formatted request on database 108. As a non-limiting example, server 102 can invoke the method "executeQuery( )" By invoking the method executeQuery( ) server 102 can transmit request 200-10 to database 108. Request 200-10 can include instructions to execute the formatted request.

Database 108 can receive request 200-10 and prior to executing the formatted request, database 108 can validate the formatted request against the framework of database 108. Database file 110 can define the framework of database 108. More specifically, database file 110 can specify the structure of database tables in database 108. For example, database file 110 can specify attributes associated with each field in a database table. Database file 110 can also define the fields of database 108. Database file 110 can include an input validator for each field of database 108. The input validator can validate any changes (adds, modification, or deletions) being made to each field based on request 200-10. As a non-limiting example, database file 110 can include the following:

--- table.schemaName = "<Schema_Name>" ; table.tableType = <Type_of_table> ; table.columns = [ {name = "<field1>" ; sqlType = <SQL_Datatype1>; length = <Length_of_characters>; comment = "<Optional_Description>"; inputValidator = "[ {include = [smallChar, specialChar] } ,{exclude = [<, >, ', ", {, } ]]", {name = "<field2>"; sqlType = <SQL_Datatype2>; length = <Length_of_characters>; comment = "<Optional_Description>";}, {name = "<fieldN>"; sqlType = <SQL_DatatypeN>; length = <Length_of_characters>; comment = "<Optional Description>";} ]; table.primaryKey.pkcolumns = [ "<primary_key_field1>", "<primary_key_field2>"];

---

In the above example, the input validator can specify that only small characters and special characters can be permitted in the respective field. However, characters such as "<", ">", "''", "" "", "{", "}" cannot be permitted in the respective field. There can be fewer or additional elements in the input validator.

Database 108 can transmit request 200-11 to database file 110 to retrieve the input validator property. Database 108 can use the input validator property to validate the elements of the formatted request against the input validator property. In the event the data to be inserted is not adhering to the specified validation protocol mentioned as a part of the input validator property, then the database framework will not allow the insertion/modification of the row (or field) in the table and will log the information with an exception. In the event the data to be inserted is validated based on the input validator property in database file 110, the formatted request is successfully executed.

In response to failing to validate a request at client device 100, server 102, or database 108, an attempted attack or security breach on database 108 can be detected, based on the attempt to execute the initial request.

In an embodiment, client device 100, server 102, and database 108 can receive and validate input requests independently. For example, client device 100 may be connected to a data storage device, such as an FTP server. Client device 100 may receive an input request to retrieve information from the data storage device (FTP server). Client device 100 may validate the input request using validation API 104 and validation service 107 as described above. In response to validating the input request, client device 100 may process the input request independent of server 102 and database 108.

Similarly, server 102 may be connected to a data storage device (e.g., a different FTP server). Server 102 may receive an input request from a device other than client device 100 to retrieve information from the data storage device (FTP server). Server 102 may validate the input request using validation API 104 and validation service 107 as described above. In response to validating the input request, server 102 may process the input request independent of client device 100 and database 108.

Moreover, database 108 may receive an input request from a device other than client device 100 or server 102. Database 108 may use database file 110 to validate the input request. In response to validating the input request, server 102 may process the input request independent of client device 100 and server 102.

Figure 3:
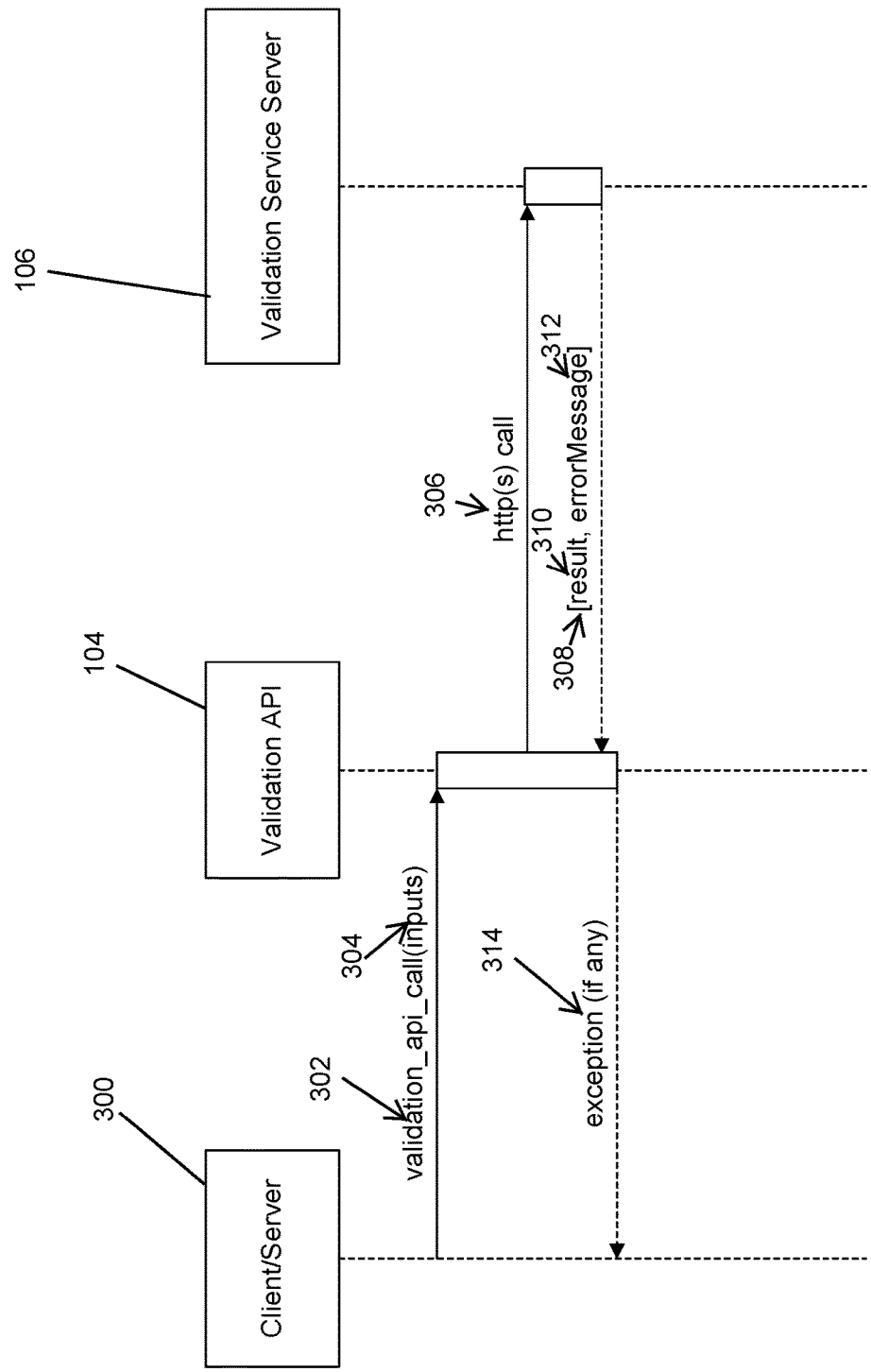
FIG. 3 illustrates the data flow for the system for validating input requests, according to some embodiments.

FIG. 3 is a flowchart illustrating data flow for the system for validating input requests, according to some embodiments. In a given embodiment, a client device or server 300 can generate a call 302 to validation API 104 to validate a request to be executed on the database. Call 302 can include input 304. Input 304 can be a string to be added, modified, deleted, or accessed in the database.

Validation API 104 can make an HTTP(s) call 306 to validation service server 106. HTTP(s) call 306 can include the input. Validation service server 106 can host the validation service. The validation service can validate the input based on a predefined set of rules for the client-side technology and server-side technology. In the event the validation service fails to validate the input, the validation server can generate a data object 308, including the validation result 310 and an error message 312. Validation result 310 can be a Boolean data structure (e.g., true or false). A "true" value can indicate successful validation of the input. A "false" value can indicate an unsuccessful validation of the input. Error message 312 can indicate the reason for an unsuccessful validation of the input. Validation service server 106 can transmit data object 308 to validation API 104.

In the event the validation service failed to validate the data object, validation API 104 can generate an exception 314 based on error message 312 included in the data object. For example, validation API 104 can have access to a library of exceptions. Validation API 104 can identify a type of error based on the error message's content and identify a corresponding exception. Validation API 104 can transmit exception 314 to client device or server 300.

Figure 4:
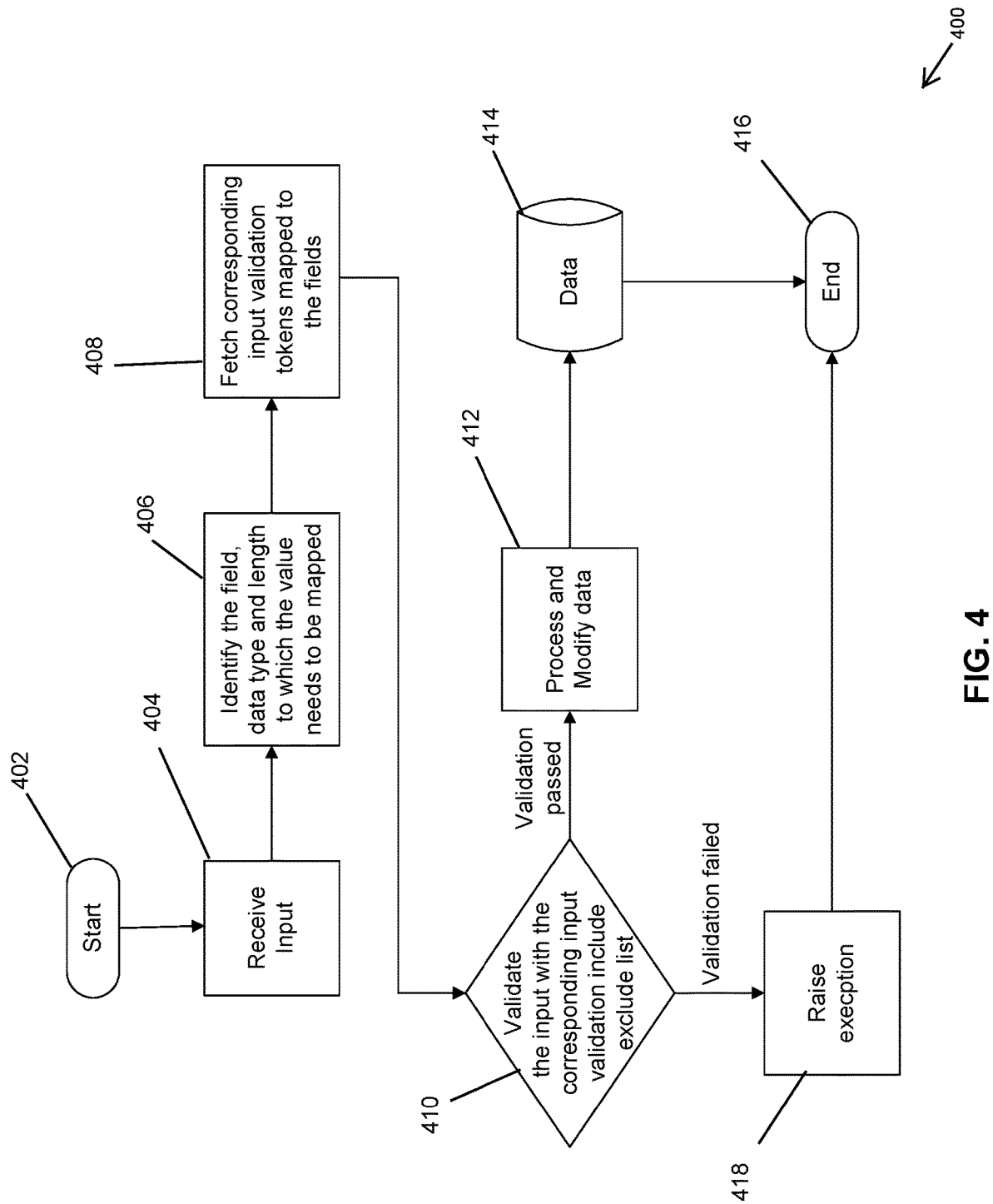
FIG. 4 is a flowchart illustrating a process for validating input requests at the database level, according to some embodiments

FIG. 4 is a flowchart illustrating a process for validating queries at the database level, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 4, as will be understood by a person of ordinary skill in the art.

Method 400 shall be described with reference to FIG. 1. However, method 400 is not limited to that example embodiment.

In 402, method 400 is initiated. Server 102 can transmit a request or query, including an input to database 108.

In 404, database 108 receives the request or query, including the input. The input can be a string that is to be added to database 108. The input can indicate the data table, column, and field in which the string is to be added.

In 406, database 108 identifies the field, data type, and length to which the value (e.g., string) of the input is to be mapped. The data type and length can be attributes associated with the field. For example, database 108 can identify the field in database 108 to which the string is to be added. The field can accept a particular data type and length of data. Database 108 can retrieve the data type and length of data accepted by the field from database file 110.

In 408, database 108 retrieves corresponding input validation tokens mapped to the fields from database file 110. The input validation tokens can be attributes associated with the field. The input validation tokens may be predefined rules for the particular field. For example, the input validation tokens can include characters in the include list and exclude list.

In 410, database 108 validates the input based on the input validation tokens. For example, database 108 validates the input based on the characters in the input string and characters that are in the include list and exclude list for the specific field. A field may permit certain characters and may restrict other characters (e.g., certain special characters).

In response to successfully validating the input method 400 may proceed to 412. In 412, database 108 processes and modifies the data based on the input. For example, database 108 may add the input in the respective field. This may entail replacing an existing string, or the input may be a brand new input in the respective field.

In 414, database 108 commits the input in the respective field, and method 400 can proceed to 416.

In 416, method 400 is terminated.

In response to failing to validate the input method 400 may proceed to 418. In 418, database 108 generates an exception based on failing to validate the input. The exception may be transmitted to client device 100 via server 102. Client device 100 can display the exception on a display device.

In response to generating the exception, method 400 can proceed to 416. In 416, method 400 is terminated.

Figure 5:
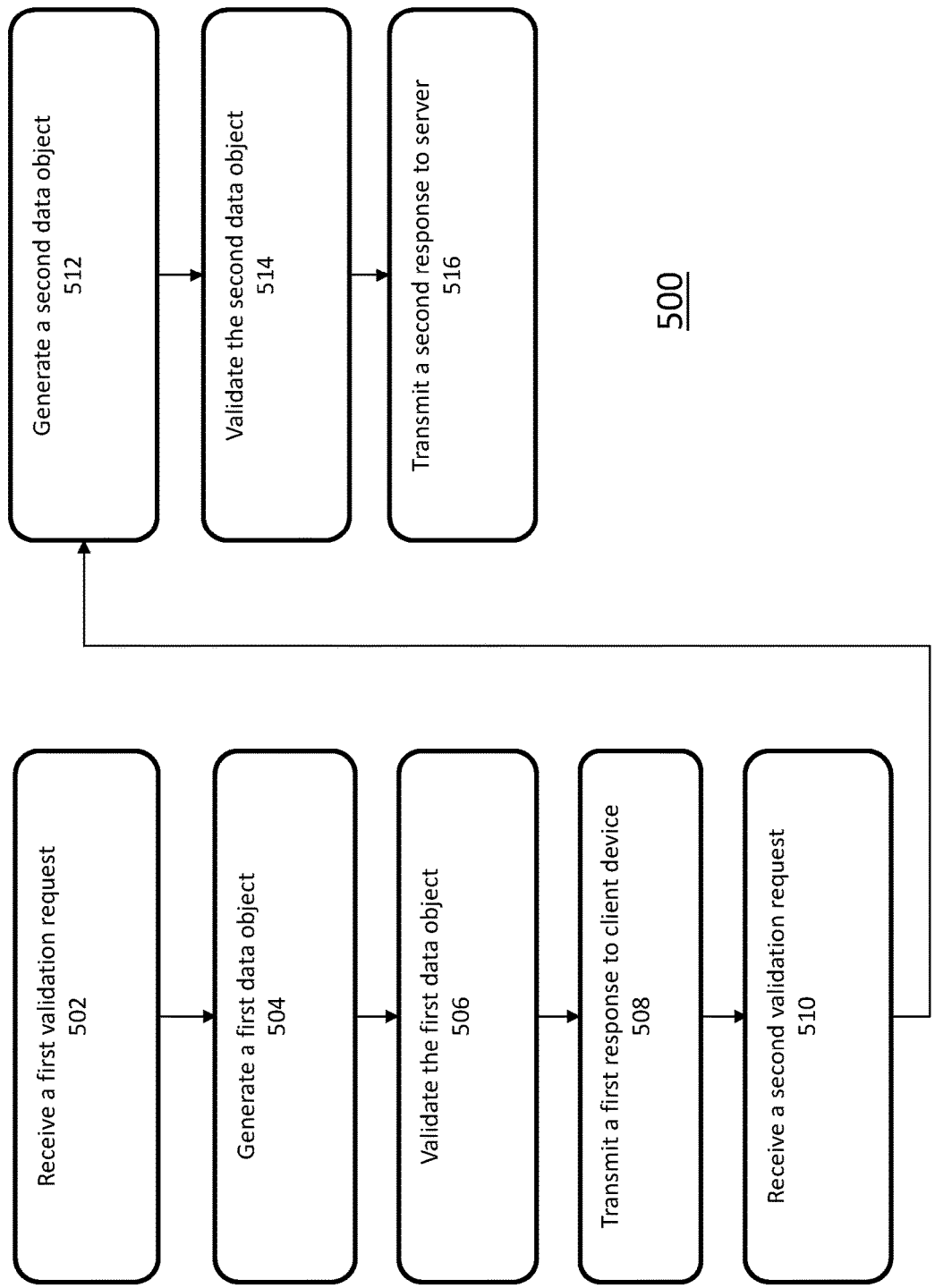
FIG. 5 is a flowchart illustrating a process for validating input requests, according to some embodiments.

FIG. 5 is a flowchart illustrating a process for validating input requests, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 5, as will be understood by a person of ordinary skill in the art.

Method 500 shall be described with reference to FIGS. 1A-1B. However, method 500 is not limited to those example embodiments. Method 500 can be implemented using a single validation API (e.g., validation API 104) configured to receive validation requests from client device 100 or server 102. Alternatively, method 500 can be implemented using first validation API 150 residing locally with respect to client device 100 and second validation API 152 residing locally with respect to server 102. First validation API 150 may be configured to receive validation requests from client device 100. Second validation API 152 can be configured to receive validation request from server 102.

In 502, validation API 104 (or first validation API 150) receives a first validation request from a client device 100. The first validation request includes a first set of elements of a first request to be executed on a database. The first request can be a query to be executed on the database. The query can be to add, modify, delete, or access data in database 108. The first set of elements can include the input (e.g., string to be input in database 108), type of data, length, permitted characters for the respective field of the input, restricted characters for the respective field of the input. Client device 100 can generate a data object and include the first set of elements in the data object.

In 504, validation API 104 (or first validation API 150) generates a first data object, including the first set of elements included in the first validation request. Validation API 104 (or first validation API 150) may unpack the data object received in the first validation request and generate the first data object using the first set of elements in the data object. The first data object can be a JSON data object.

In 506, validation API 104 (or first validation API 150) validates the first data object using validation service 107. Validation service 107 can be an HTTP(s) service hosted by validation service server 106. Validation API 107 may transmit the first data object to validation service 107 as a payload. Validation service 107 may validate the first data object based on a predefined set of rules specific to client-side technology implemented by client device 100. The predefined set of rules may be associated with the first set of elements. Validation service 107 may generate a response indicating the first validation result. The first validation result may indicate whether the first data object was successfully or unsuccessfully validated. The response may also include an error message if validation service 107 failed to validate the first data object. The error message can indicate the reason validation service 107 failed to validate the first data object. Validation service 107 can transmit the response to validation API 104.

In 508, validation API 104 (or first validation API 150) transmits a first response to client device 100, including the first validation result of the first data object. The first response can include an indication of whether the first data object was successfully validated and an error message in the event the first data object was not successfully validated.

In 510, validation API 104 (or second validation API 152) receives a second validation request, including a second set of elements of a second request to be executed on the database from server 102. The second request mirrors the first request. For example, the first request can be transmitted from client device 100 to server 102 in response to successfully validating the first data object. The first request can be a query in a first format (as a non-limiting example a javascript), and a software component (as a non-limiting example a JDBC driver) executing on server 102 can format the first request into a second request. As such, the second request can be a query. Before executing the second request, server 102 can break down the second request into the second set of elements. Server 102 can generate an array of objects and transmit the array of objects to validation API 104 with the second validation request.

In 512, validation API 104 (or second validation API 152) generates a second data object, including the second set of elements included in the second validation request. Validation API 104 can identify the second set of elements from the array of objects received with the second validation request. The second data object may be a JSON data object.

In 514, validation API 104 (or second validation API 152) validates the second data object using validation service 107. Validation API 104 (or second validation API 152) can transmit the second data object to validation service 107. Validation service 107 can validate the second data object based on predefined rules specific to server-side technology implemented by server 102. The predefined set of rules may be associated with the second set of elements. Validation service 107 may generate a response indicating the second validation result. The second validation result may indicate whether the second data object was successfully or unsuccessfully validated. The response may also include an error message if validation service 107 failed to validate the second data object. The error message can indicate the reason validation service 107 failed to validate the second data object. Validation service 107 can transmit the response to validation API 104.

In 516, validation API 104 (or second validation API 152) transmits a second response to server 102, including the second validation result of the second data object. The first response can include an indication of whether the first data object was successfully validated and an error message in the event the first data object was not successfully validated. In response to successfully validating the second data object, the server executes the second request on the database.

Figure 6:
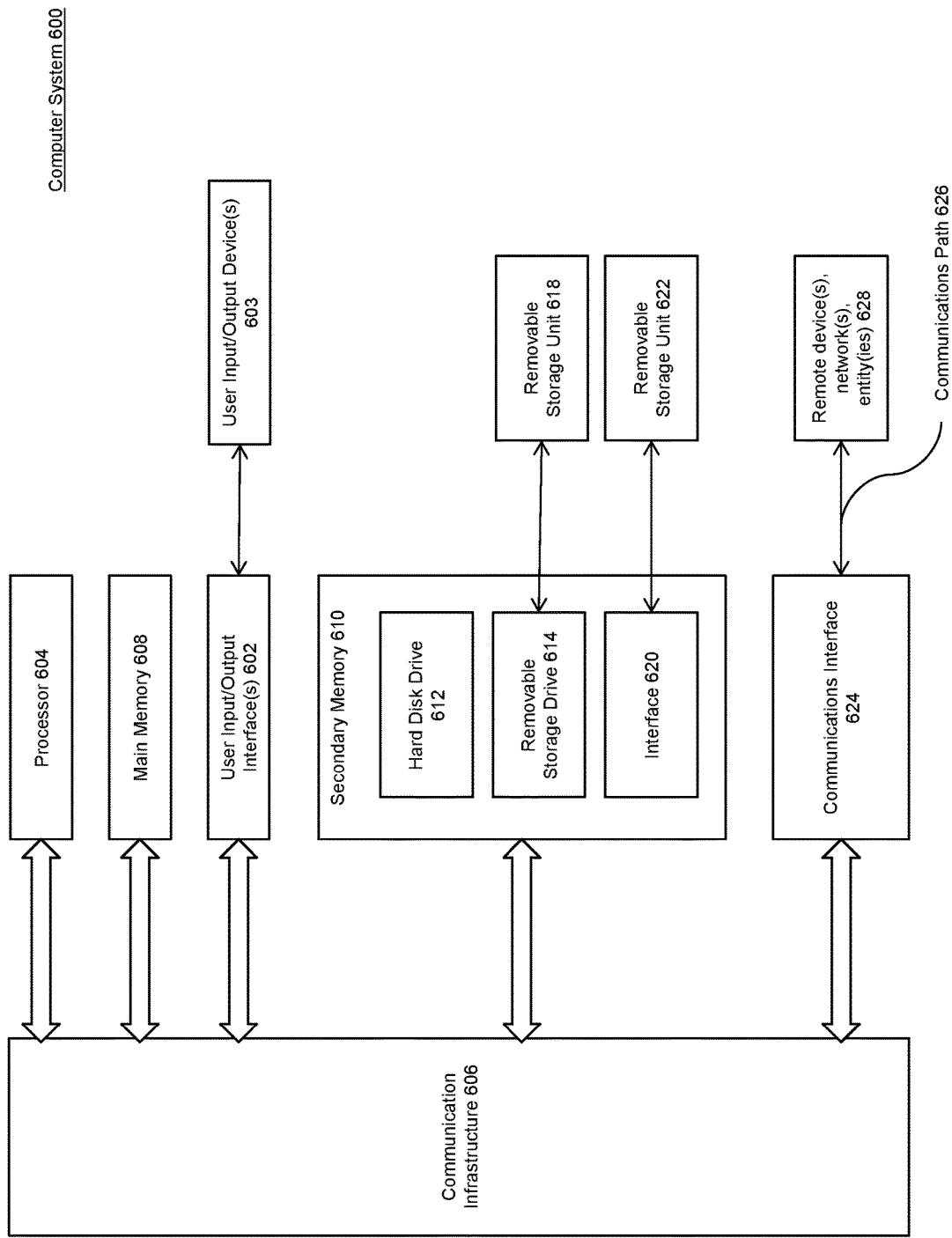
FIG. 6 is an example computer system useful for implementing various embodiments.

Various embodiments can be implemented, for example, using one or more computer systems, such as computer system 600 shown in FIG. 6. Computer system 600 can be used, for example, to implement methods 400 of FIG. 4, and 500 of FIG. 5. Furthermore, computer system 600 can be at least part of client device 100, server 102, database 108, and validation service server 106, as shown in FIG. 1. For example, computer system 600 route communication to various applications. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 can include one or more levels of cache. Main memory 608 has stored therein control logic (i.e., computer software) and/or data.

Computer system 600 can also include one or more secondary storage devices or memory 610. Secondary memory 610 can include, for example, a hard disk drive 612 and/or a removable storage device or drive 614. Removable storage drive 614 can be a floppy disk drive, a magnetic tape drive, a compact disk drive, an optical storage device, tape backup device, and/or any other storage device/drive.

Removable storage drive 614 can interact with a removable storage unit 618. Removable storage unit 618 includes a computer usable or readable storage device having stored thereon computer software (control logic) and/or data. Removable storage unit 618 can be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 can include other means, instrumentalities, or other approaches for allowing computer programs and/or other instructions and/or data to be accessed by computer system 600. Such means, instrumentalities, or other approaches can include, for example, a removable storage unit 622 and an interface 620. Examples of the removable storage unit 622 and the interface 620 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 can further include a communication or network interface 624. Communication interface 624 enables computer system 600 to communicate and interact with any combination of remote devices, remote networks, remote entities, etc. (individually and collectively referenced by reference number 628). For example, communication interface 624 can allow computer system 600 to communicate with remote devices 628 over communications path 626, which can be wired and/or wireless, and which can include any combination of LANs, WANs, the Internet, etc. Control logic and/or data can be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for validating input requests, the method comprising:
   receiving, by one or more computing devices, a first validation request from a client device corresponding to a query to be executed on a database, wherein the first validation request includes a first set of elements of a first request corresponding to the query and prior to execution of the query against the database;
   generating, by the one or more computing devices, a first data object including the first set of elements included in the first validation request;
   determining, by the one or more computing devices, a validation of the first data object based on identifying whether the first data object includes one or more restricted characters for a first data type corresponding to the first data object, wherein an identification of the one or more restricted characters for the first data type in the first data object comprises an error in the validation of the first data object;
   transmitting, by the one or more computing devices, a first response to the client device, the first response including a first validation result of the first data object;
   receiving, by the one or more computing devices, from a server that receives the query from the client device, a second validation request including a second set of elements of a second request to be executed on the database, wherein the second request mirrors the first request and corresponds to the query;
   generating, by the one or more computing devices, a second data object including the second set of elements included in the second validation request;
   determining, by the one or more computing devices, a validation of the second data object based on identifying whether the second data object includes the one or more restricted characters for a second data type corresponding to the second data object, wherein an identification of the one or more restricted characters for the second data type in the second data object comprises an error in the validation of the second data object;
   transmitting, by the one or more computing devices, a second response to the server,
   the second response including a second validation result of the second data object; and
   providing the query to be executed on the database in response to successfully validating both the first data object from the client device and the second data object from the server.

2. The method of claim 1, wherein a framework of the database validates the second set of elements of the second request prior to processing the second request.

3. The method of claim 1, wherein a validating service validates the first data object and the second data object based on a set of rules associated with the first or second set of elements.

4. The method of claim 1, further comprising identifying, by the one or more computing devices, a security breach in response to failing to validate the first or second set of elements.

5. The method of claim 1, wherein the first request and the second request include a string input.

6. The method of claim 5, further comprising:
   generating, by the one or more computing devices, an error message to be included in the first response in response to the first validation result indicating a failure to validate the first data object, wherein the error message includes a reason for the failure;
   causing, by the one or more computing devices, the client device to display the error message and the string input with a visual effect.

7. The method of claim 1, further comprising
   identifying, by the one or more computing devices, a solution to resolve an error in the validation of the first data object or second data object, in response to failing to validate the first or second set of elements using a machine-learning algorithm; and
   transmitting, by the one or more computing devices, the solution to the client device or the server.

8. The method of claim 1, further comprising:
   receiving, from a user, a solution to resolve the error in the validation of the first data object; and
   learning, by a learning engine, the received solution to resolve the error, wherein learning engine is configured to provide the received solution upon a subsequent detection of the error.

9. The method of claim 1, wherein the determining the validation of the first data object comprises:

determining a validation result comprising both a Boolean indicating whether the validation was successes and a string indicating an error message for an unsuccessful validation.

10. The method of claim 1, wherein the determining the validation of the first data object and the determining the validation of the second data object are performed independently of one another.

11. A system for validating input requests, the system comprising:
a memory;
a processor coupled to the memory, the processor configured to:
receive a first validation request from a client device corresponding to a query to be executed on a database, wherein the first validation request includes a first set of elements of a first request corresponding to the query and prior to execution of the query against the database;
generate a first data object including the first set of elements included in the first validation request;
validate the first data object based on identifying whether the first data object includes one or more restricted characters for a first data type corresponding to the first data object, wherein an identification of the one or more restricted characters for the first data type in the first data object comprises an error in the validation of the first data object;
transmit a first response to the client device, the first response including a first validation result of the first data object;
receive, from a server that receives the query from the client device, a second validation request including a second set of elements of a second request to be executed on the database, wherein the second request mirrors the first request and corresponds to the query;
generate a second data object including the second set of elements included in the second validation request;
validate the second data object based on identifying whether the second data object includes the one or more restricted characters for a second data type corresponding to the second data object, wherein an identification of the one or more restricted characters for the second data type in the second data object comprises an error in the validation of the second data object;
transmit a second response to the server, the second response including a second validation result of the second data object; and
provide the query to be executed on the database in response to successfully validating both the first data object from the client device and the second data object from the server.

12. The system of claim 11, wherein a framework of the database validates the second set of elements of the second request prior to processing the second request.

13. The system of claim 11, wherein a validating service validates the first data object and second data object based on a set of rules associated with the first and second set of elements.

14. The system of claim 11, the processor further configured to identify a security breach in response to failing to validate the first or second set of elements.

15. The system of claim 11, wherein the first request and the second request include a string input.

16. The system of claim 15, the processor further configured to:
generate an error message to be included in the first response in response to the first validation result indicating a failure to validate the first data object, wherein the error message includes a reason for the failure; and
cause the client device to display the error message and the string input with a visual effect of highlighting the error message.

17. The system of claim 11, the processor further configured to:
identity a solution to resolve the error in the validation of the first data object or the second data object, in response to failing to validate the first or second set of elements using a machine-learning algorithm; and
transmit the solution to the client device or the server.

18. A non-transitory computer-readable medium having instructions stored thereon, execution of which, by one or more processors of a device, cause the one or more processors to perform operations comprising:
receiving a query from a server, wherein the query adds or modifies an input into a database;
mapping the input to a field in the database;
retrieving attributes associated with the field to which the input is to be mapped from a property in a database file;
validating the input based on both identifying whether input includes the one or more restricted characters for a data type corresponding to the field and based on the attributes about the field, wherein the validating comprises performing both a first validation of a first data object received from a client device and a second validation of a second data object received from the server;
in response to successfully validating the input based on both the first validation and the second validation:
processing the query;
in response to failing to validate the input based on either the first validation and the second validation:
transmitting an exception to the server.

19. The non-transitory computer-readable medium of claim 18, wherein the database file defines a framework of the database.

20. The non-transitory computer-readable medium of claim 18, the operations further comprising:
determining that the attributes include type of data, length, and permitted characters;
identifying the data type, length, and characters of the input; and
comparing the data type, length, and characters of the input against the attributes associated with the field.

* * * * *